United States Patent [19]

Rather et al.

[11] Patent Number: 5,491,919
[45] Date of Patent: Feb. 20, 1996

[54] MULTI-FUNCTIONAL VARIABLE POSITION RIFLE AND CAMERA MOUNT

[76] Inventors: Lewis L. Rather; Brenda L. Rather, both of 6104 A Parkwood Dr., Austin, Tex. 78735; Larry W. Mobley, HCO Rte. 3 Box 81J, Spice Wood, Tex. 78669

[21] Appl. No.: 279,011

[22] Filed: Jul. 22, 1994

Related U.S. Application Data

[63] Continuation-in-part of Ser. No. 898,830, Jun. 15, 1992, Pat. No. 5,347,740.

[51] Int. Cl.⁶ ..................................... F41A 23/06
[52] U.S. Cl. .................... 42/94; 248/183.1; 248/515; 354/293
[58] Field of Search ................ 42/94; 89/37.03, 89/37.04, 40.06; 248/183, 515; 346/38; 354/81, 293

[56] References Cited

U.S. PATENT DOCUMENTS

| | | | |
|---|---|---|---|
| 1,939,699 | 12/1933 | Hofstetter | 89/37.03 |
| 4,026,057 | 5/1977 | Cady | 42/94 |
| 4,913,391 | 4/1990 | Klipp | 42/94 |
| 4,937,965 | 7/1990 | Narvaez | 42/94 |
| 5,070,636 | 12/1991 | Mueller | 42/94 |
| 5,081,783 | 1/1992 | Jarvis | 42/94 |
| 5,347,740 | 9/1994 | Rather et al. | 42/94 |

FOREIGN PATENT DOCUMENTS 430025  10/1911  France ............................ 89/37.04

*Primary Examiner*—Stephen C. Bentley
*Attorney, Agent, or Firm*—Joseph F. Long

[57] ABSTRACT

A combination of a camera mount and a gun mount allowing horizontal, vertical and positional adjustment with manually activated locking knobs allowing comfortable multidirectional shooting with a gun that may be rigidly clamped in any one of a multiplicity of rapidly adjustable positions and with the camera adjustably mounted allowing a hunter to take a picture instead using the gun.

6 Claims, 4 Drawing Sheets

MULTI-FUNCTIONAL VARIABLE POSITION RIFLE AND CAMERA MOUNT

This is a continuation-in-part of Ser. No. 07/898,830 filed Jun. 15, 1992, now U.S. Pat. No. 5,347,740, by Rather et al entitled "A Multi-functional Variable Position Rifle and Camera Mount." This application filed Jun. 15, 1992, Ser. No. 07/898,830, is incorporated herein by reference.

BACKGROUND OF THE INVENTION

The present invention differs significantly from application Ser. No. 07/898,830, in that we have found that a horizontally fixed variable position mounting beam with quick height adjustment on either the rearward end or of the forward end of a rifle is necessary in some applications and is preferable to an adjustable tilting mounting beam. Other changes to allow positioning of the camera and to reduce manufacturing cost with minor versatility loss are included in this invention. These changes include use of stop pins to replace adjustable collars in assembly of the unit.

SUMMARY OF THE INVENTION

The objectives of this invention includes:

a) having a mounting beam for a rifle and/or a camera with a clamp or mounting device suitable for rigid attachment to a hunting stand or hunting vehicle and with movable mechanism to allow a hunter to comfortably aim and rapidly lock the rifle or camera in any one of the many positions; and b) having clamping mechanisms that allow rapid clamping of the rifle and the movable parts of the device in a fixed position thereby allowing essentially perfect shooting.

The preferred embodiment of the invention may be described as five major components. These are:

1) a rifle and camera mounting beam with means to adjustably fasten a rifle and/or camera to the mounting beam.

2) a cylindrical mounting post that rigidly attaches to the mounting beam with the mounting beam having a manually adjustable height adjustment for the muzzle end of the rifle by raising or layering the front mounting means to mount the rifle to the mounting beam.

3) an outer mounting open cylinder attached at right angles to a cylindrical side arm or horizontal positioning and; the outer mounting cylinder being sized to closely but slidably fit over the cylindrical mounting post with length of the mounting post and stop pins in the outer mounting cylinder determining the vertical height of the gun mounting beam above the outer mounting open cylinder and allowing the mounting post to be rotated in the outer mounting open cylinder;

4) a tee shaped mounting piece or T shaped swivel piece comprising an open cylinder sized to closely but slidably fit the horizontal positioning arm and attached at right angles to a cylindrical pivot post;

5) a U shaped clamp, also called a base plate clamp means, with a threaded thumbscrew or similar locking device in one leg of the U shaped clamp to allow the clamp to move easily and be fastened rigidly to a rail such as found in a deer blind or as may be installed on a vehicle and an open inner mounting cylinder attached to the other leg of the U shaped clamp; the open inner mounting cylinder is sized to closely but slidably fit over the cylindrical pivot post of the tee shaped mounting piece.

To assemble for use, the U shaped clamp with the open inner mounting cylinder is clamped to a rail or horizontal support piece. The cylindrical pivot post of the tee shaped mounting piece is slipped into the inner open mounting cylinder. The horizontal positioning arm or side arm of the outer mounting cylinder is slipped into the horizontal open cylinder of the tee shaped mounting piece. The cylindrical mounting post, which is attached to the mounting beam, is slipped into the outer mounting cylinder and the rifle and/or camera are fastened to the mounting beam. All pieces may be rigidly attached to each other by tightening thumbscrews or similar locking devices in the inner mounting cylinder, the open cylinder holding the positioning arm and the inner mounting cylinder. The mounting beam is rigidly attached to the cylindrical mounting post and held in a horizontal position. The hunter may move the gun in a natural movement and lock the gun or camera in a given horizontal position as he wishes. The many different positions are made possible because the side arm or positioning arm can both pivot and slide in or out thereby allowing a range of positions of the inner mount that allows the rifle to be pivoted while the manually adjustable front mounting means allows tilting the rifle to make either a very close or long shot. Further flexibility may be attained by installing one or more roller bearings in the short section of the U shaped clamp thereby allowing the clamp to move easily on a support rail before clamping rigidly to the support rail.

We've described a preferred embodiment of the unit as made essentially from sections of open pipe; however, one skilled in the art could make mechanical modifications to allow similar clamping and movement of the rifle and camera, we therefore do not wish to be limited to exact details, but only as to general spirit and purpose as outlined in these claims and specifications.

DETAILED DESCRIPTION OF THE DRAWING

A preferred embodiment of the invention may best be described by reference to the drawings.

Figure 1:
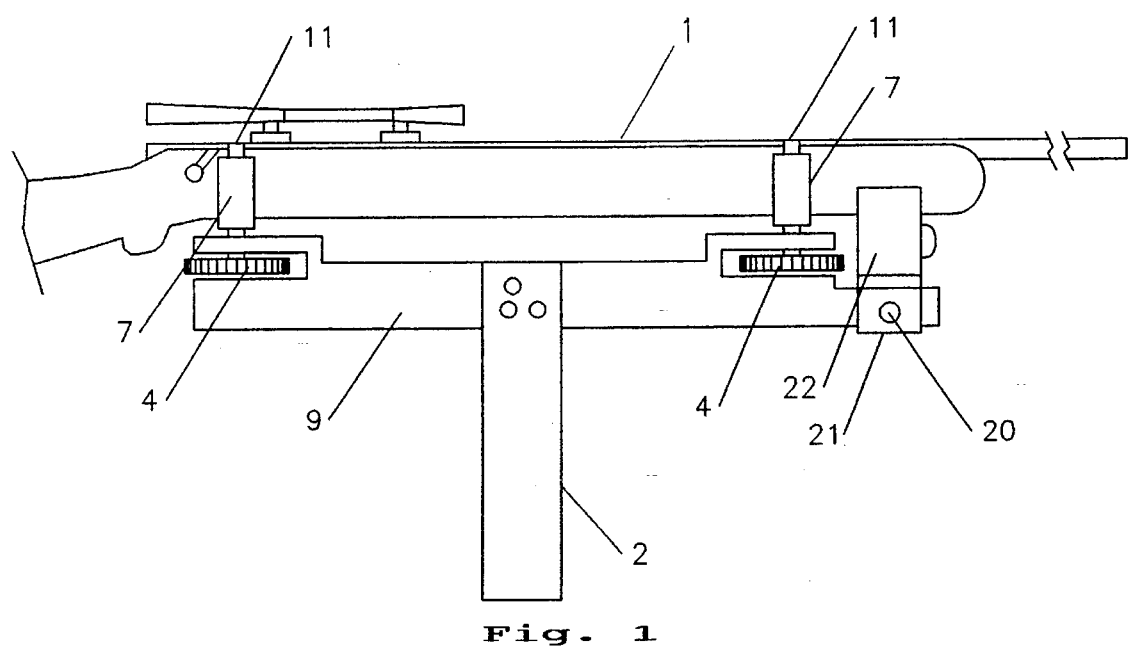
FIG. 1 shows a rifle and camera attached to a rifle mount beam which is rigidly attached to a cylindrical mounting post.

In FIG. 1 we show a rifle 1 held in mounting units 7 with tie down straps 11 that conveniently may be made from Velcro™. One mounting unit 7 is attached rigidly to the mounting beam 9 and the second mounting unit is attached to a threaded post to adjust the height of this second mounting unit 7 with thumbscrew 4. Also removeably attached to mounting beam 9 is camera mount unit 21. The

Figure 2:
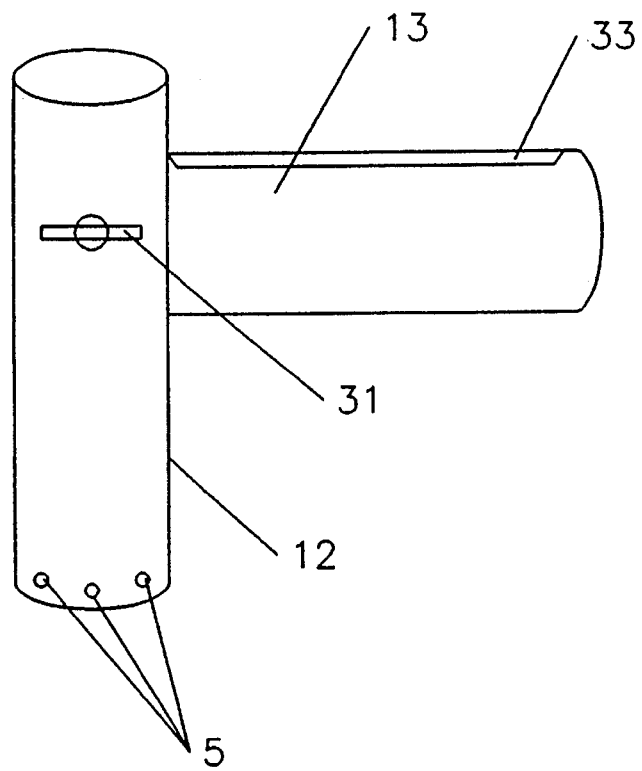
FIG. 2 shows a tee shaped piece comprising an outer cylinder holder to rotateably hold the cylindrical mounting post with the outer cylinder holder having positioning arm or side arm attached thereto.

3 pivot locking knob 20 may be used to hold the mounting unit 21 with camera 22 to the beam 9 in an adjustable fashion. As shown the threaded thumbscrew 4 could be used under both mounting units 7. Rifle mounting beam 9 is rigidly attached to cylindrical mount post 2. The cylindrical mounting post 2 slips into outer mounting cylinder 12, as shown in FIG. 2. FIG. 2 stop pins 5 allow rotation of mounting post 2 at a fixed height with thumbscrew 31 allowing post 2 to be locked in position.

Figure 3:
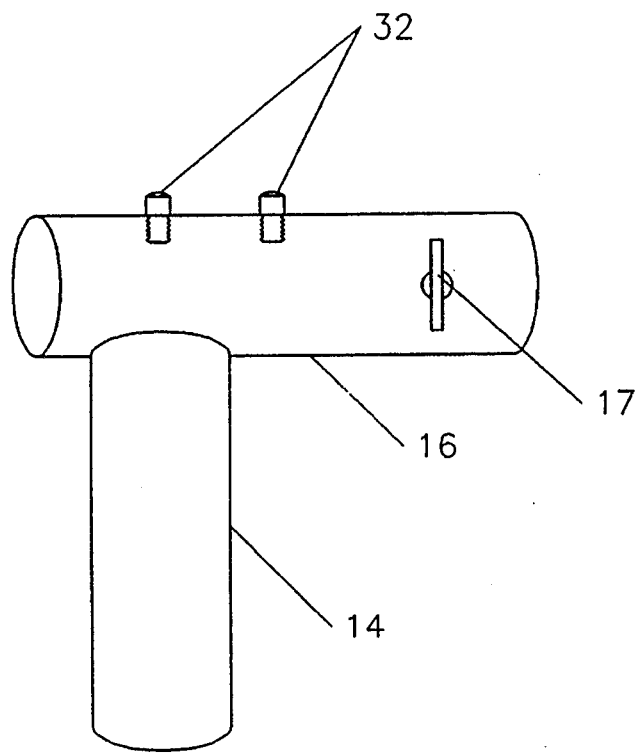
FIG. 3 shows a T shaped swivel piece comprising a positioning arm holder to slidably fit over positioning arm of FIG. 2 and a cylindrical post attached at fight angles to the positioning arm holder.

FIG. 2 shows the outer mounting cylinder 12 and side arm 13 with slot 33 which acts to hold the outer mounting cylinder 12 in a vertical position as side arm 13 slides into side arm holder 16, FIG. 3, with slot 33 fitting closely around guide pins 32, FIG. 3. The side arm 13 is sized to fit closely but to slide easily in side arm holder 16, FIG. 3. Threaded guide pins 32 also act to prevent arm 13 from disengaging from side and holder 16.

In FIG. 3 we show a T shaped swivel piece comprising side arm holder 16 rigidly attached at right angles to a cylindrical post 14. Cylindrical post 14 is sized to fit closely and rotatably on stop pins 30 in the inner cylindrical mounting cylinder 19, FIG. 4. Thumbscrew or lockpin 35 may be used to lock cylindrical post 14 in position when desired.

In one preferred embodiment post 2, FIG. 1, outer mounting cylinder 12, FIG. 2, cylindrical post 14, FIG. 3, and inner cylindrical mounting cylinder 19 all may be approximately 6" long and ¾ to 2 inches in diameter. Side arm 13 is preferably about 12" long with side arm holder 16 being approximately 6" in length.

Figure 4:
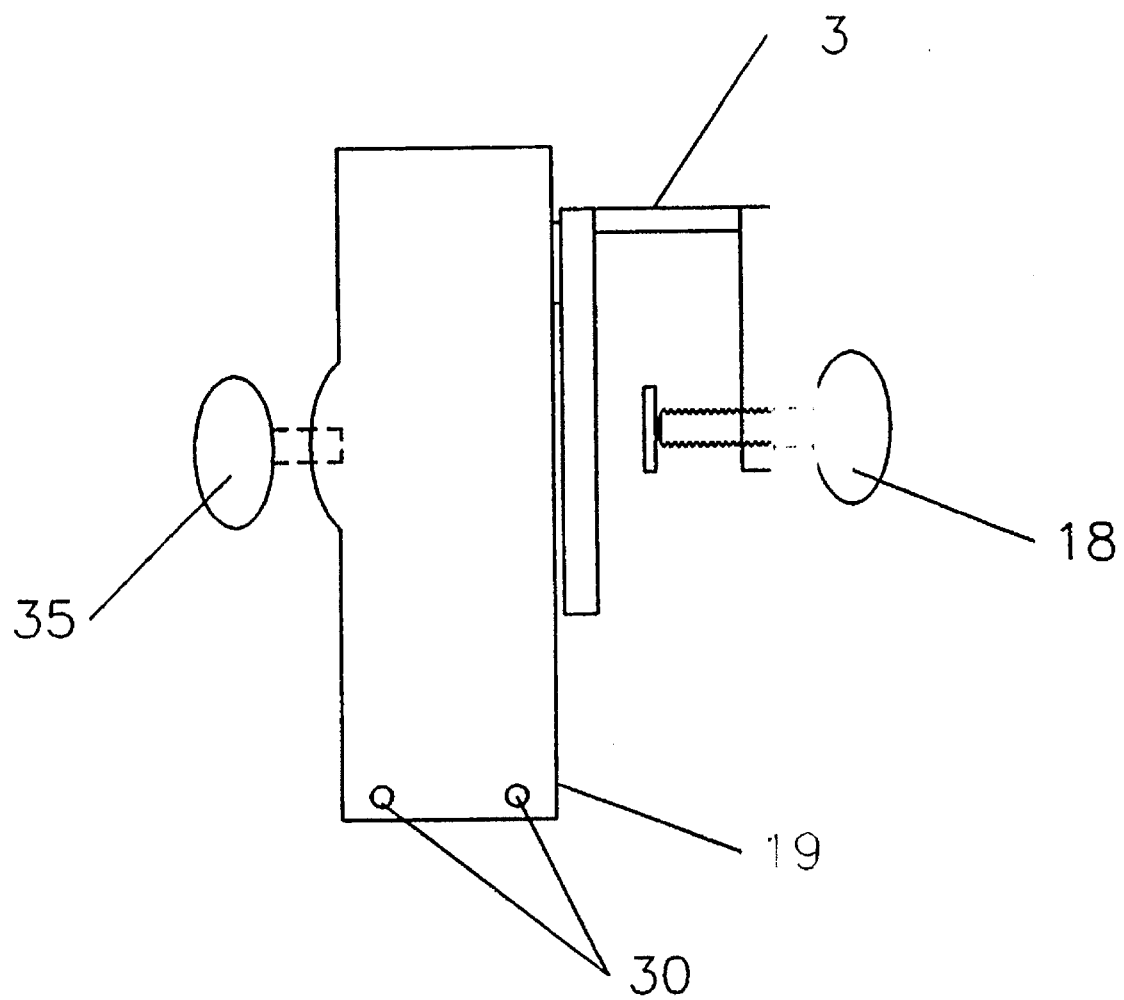
FIG. 4 shows a clamp to movably fasten to a fixed position rail with the clamp attached to an open cylindrical holder sized to hold the cylindrical post which is attached to the positioning arm holder as shown in FIG. 3.

In FIG. 4 we show a base plate clamp means, a U shaped clamp 23 preferably made of about ¼" thick steel with a shorter leg of the clamp having a locking screw with knob 18 to fasten clamp 23 to a metal or wooden rail. The longer leg of the U shaped clamp has an open inner cylindrical mounting cylinder 19 which may be rigidly attached thereto with bolts or by brazing or welding with welding being preferred. Hardened aluminum is the preferred construction material and it may be brazed to steel clamp 23.

Figure 5:
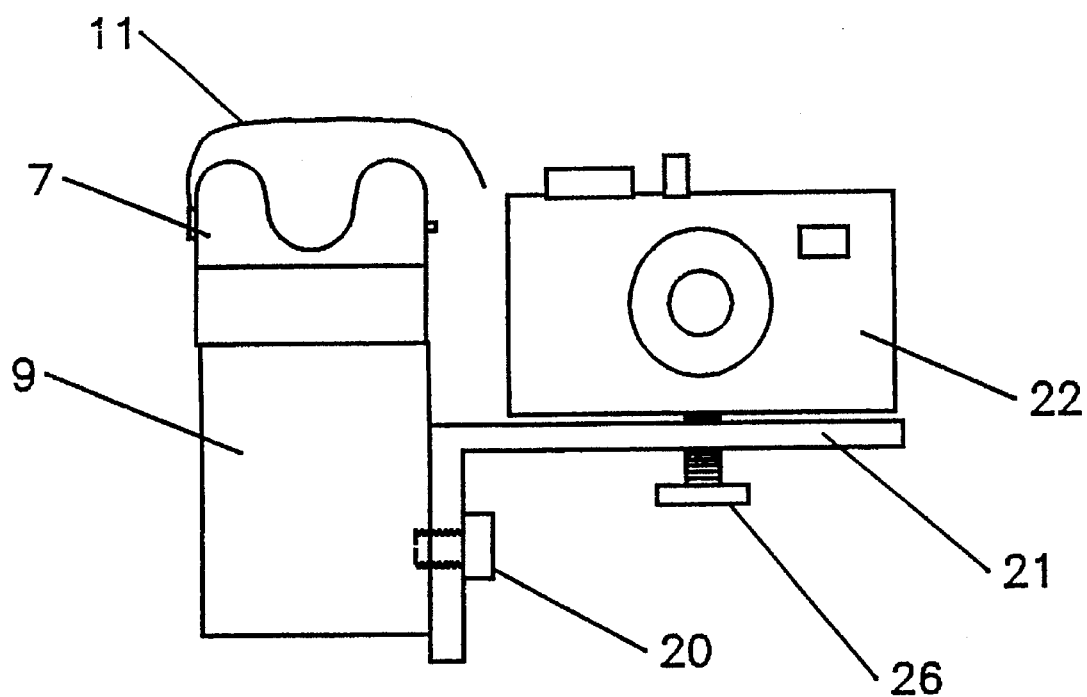
FIG. 5 shows a camera and camera mount attachable to the rifle mount beam.

In FIG. 5 one preferred type of camera mount 21 is shown to allow removable and adjustable attachment to mounting beam 9 with a pivot locking knob 20. Camera 22 may be attached in an adjustable fashion with a threaded bolt in knob 26 going through camera mount 21 into a threaded opening normally found in cameras for a tripod mount. Camera 22 could also be fastened to camera mount 21 with Velcro™ straps (not shown).

In a second embodiment of the invention, cylindrical post 2 of FIG. 1 may be fitted into inner cylindrical holder 19 to give a simpler assembly usable in more limited space than the more complex assembly described under the preferred embodiment.

The above descriptions are of preferred embodiments but differing shapes, differing pieces and differing clamping means could be used to accomplish the major purpose of this design which may be described as holding a rifle and/or camera in a removable, fixed position with mechanism to:

1) allow a swinging motion about a pivot point;

2) allow a forward and backward motion;

3) allow a height adjustment to accommodate users of differing heights;

4) allow moving the pivot point thereby allowing a wider range of swinging motions;

5) allow horizontal adjustments with hand operated mechanisms;

6) to have available manually operable locking mechanism to hold the rifle and/or camera in a fixed position when the rifle is sighted on target.

What is claimed is:

1. A multi-functional variable position rifle and camera mount comprising:
 a) a base plate clamp means and an inner cylindrical holder attached thereto;
 b) a threaded manually operable thumbscrew and stop pins in said inner cylindrical holder;
 c) a rifle mounting beam, and a cylindrical mounting post with said cylindrical mounting post rigidly attached to said rifle mounting beam and with said cylindrical mounting post sized to slidably fit into said inner cylindrical holder and rotate on said stop pins locked in place using said threaded thumbscrew in said inner cylinder holder;
 d) a pair of rifle mounts and tie down means attached to said rifle mounting beam to allow fastening a rifle rigidly in said rifle mounts;
 e) a manually operable threaded means to allow adjusting the heighth one of said pair of rifle mounts.

2. A multi-functional variable position rifle and camera mount as in claim 1 wherein said base plate clamp means comprises a U shaped base with a manually operable means to fasten said clamp to a fixed rail in one leg and with said inner cylindrical holder rigidly attached to a second leg.

3. A multi-functional variable position rifle and camera mount comprising:
 a) a base plate clamp means and inner cylindrical holder attached thereto;
 b) a threaded manually operable lock pin means in said cylindrical holder;
 c) a T shaped swivel piece with a pivot post sized to fit movably in said inner cylindrical holder and an open positioning cylinder with guide pins through the side wall with said open positioning cylinder mounted at right angles to an upper end of said pivot post;
 d) an outer mounting cylinder with stop pins in a lower end and with a manually operable thumbscrew; said outer mounting cylinder rigidly attached at right angles to a slotted arm sized to movably slide into said open positioning cylinder with said slot sliding over said guide pins;
 e) a cylindrical post sized to fit movably above said stop pins in said outer mounting cylinder;
 f) a mounting beam means rigidly attached to said cylindrical post;
 g) dual rifle mounts attached to said mounting beam with means to removably hold a rifle in said dual mounts;
 h) a manually operable threaded means to allow adjusting the heighth of one of said dual rifle mounts.

4. A multi-functional variable position rifle and camera mount as in claim 3 further comprising a positionally adjustable camera mount attached to said mounting beam means.

5. A multi-functional variable position rifle and camera mount comprising:
 a) a mounting beam, a pair of rifle mount means, and a positionally adjustable camera mount means; said rifle mount means being attached to said mounting beam and acting to rigidly but removably hold a rifle in said mount means and said camera mount means being attached to said mounting beam and acting to removably hold a camera in said positionally adjustable camera mount means;

b) a cylindrical mounting post rigidly attached to said mounting beam;

c) a manual vertical adjustment means under one of said pair of rifle mount means and acting to tilt said rifle relative to said mounting beam;

d) a clamp, an outer mounting open cylinder with a side arm, a side arm holder attached to a cylindrical post, and an inner open mounting cylinder cooperating to make a fixed position swivel joint by sliding said cylindrical post attached to said arm holder into said inner open mounting cylinder and to make a moveable position outer swivel connection by sliding said cylindrical mounting post, which is rigidly attached to said mounting beam, into said outer mounting cylinder and sliding said arm into said side arm holder.

6. A multi-functional variable position rifle and camera mount as in claim 5 wherein said inner mounting open cylinder, said outer mounting cylinder and said side arm holder are each equipped with manually adjustable means to allow holding said mounting post in a fixed position in said outer mounting cylinder and to allow holding said arm in a fixed position in said side arm holder and to allow holding said cylindrical post attached to said side arm holder in a fixed position in said inner mounting open cylinder.

* * * * *